United States Patent [19]

Johnson et al.

[11] Patent Number: 4,605,039
[45] Date of Patent: Aug. 12, 1986

[54] RUNAWAY PROTECTIVE FUSE VALVE

[75] Inventors: Myron J. Johnson, Arlington Heights; Mark C. C. Kao, Elmhurst, both of Ill.

[73] Assignee: Stewart-Warner Corporation, Chicago, Ill.

[21] Appl. No.: 657,801

[22] Filed: Oct. 4, 1984

[51] Int. Cl.[4] .............................................. F16K 17/30
[52] U.S. Cl. .................................. 137/460; 137/462; 137/498
[58] Field of Search ...................... 137/460, 462, 498

[56] References Cited

U.S. PATENT DOCUMENTS

| | | | |
|---|---|---|---|
| 1,153,850 | 9/1915 | Meier | 137/460 |
| 2,690,758 | 10/1954 | Lee | 137/460 |
| 3,476,141 | 11/1969 | Tillman | 137/498 |
| 3,910,306 | 10/1975 | Ohrn | 137/498 |

Primary Examiner—Arnold Rosenthal
Attorney, Agent, or Firm—A. G. Douvas

[57] ABSTRACT

A runaway valve for an air-driven material pump that shuts off air flow to the pump when air flow rate exceeds a predetermined setting to prevent pump damage, wherein the valve includes a flow-responsive poppet valve member and an axially movable sleeve finely adjustable about a first position to select flow rate, and movable to a second position to interconnect the upstream and downstream sides of the poppet valve member to effect reset. A closed chamber with a vent hole buffers the upstream side of the poppet valve member from inlet pressure to delay valve closing and compensate for pressure transients. In its reset position, the sleeve isolates this chamber from inlet pressure to achieve faster reset.

11 Claims, 5 Drawing Figures

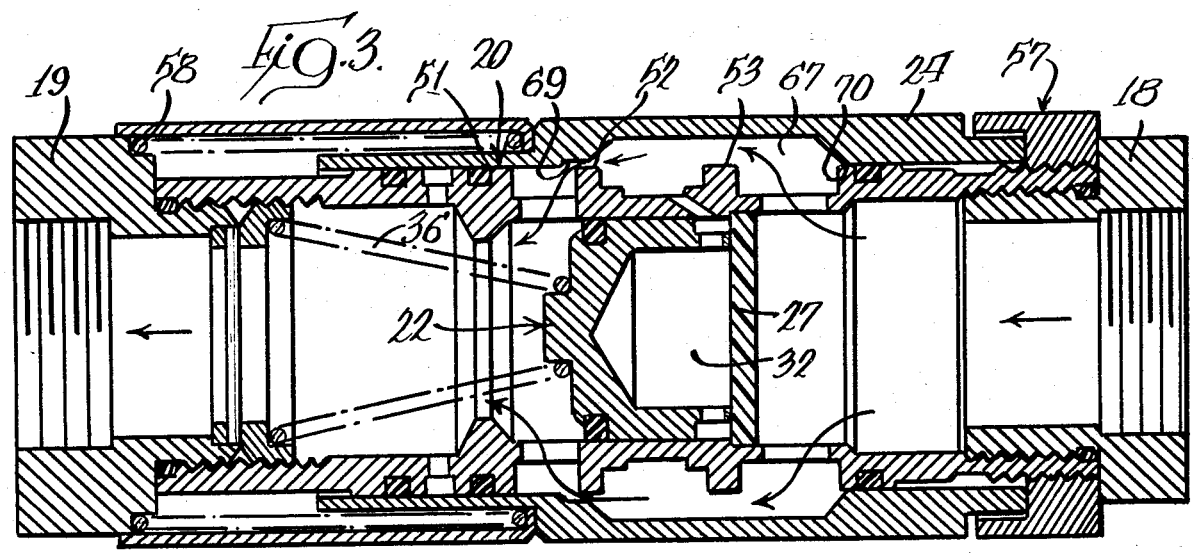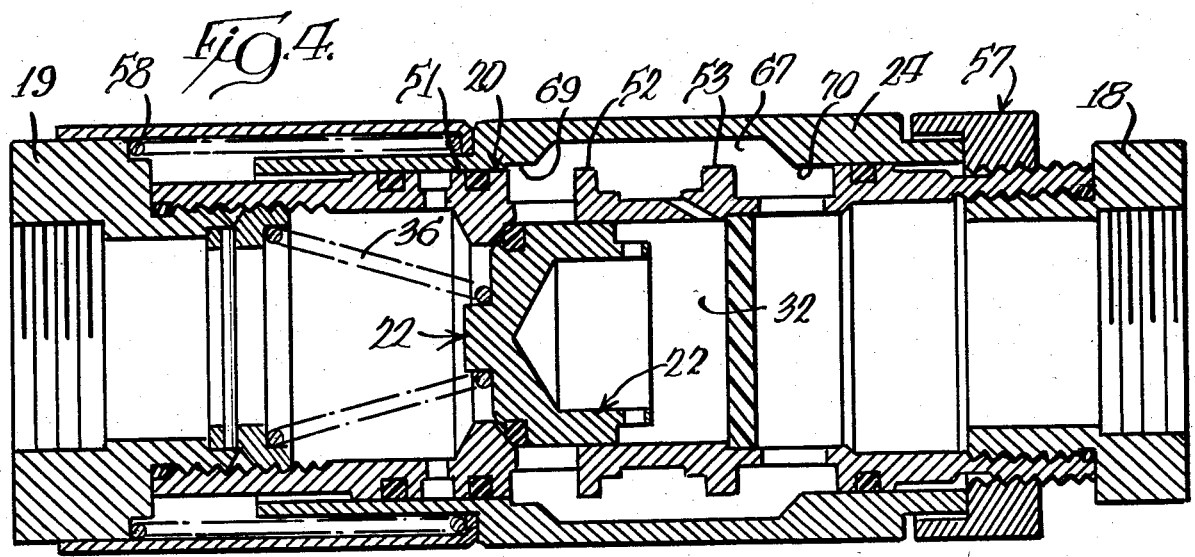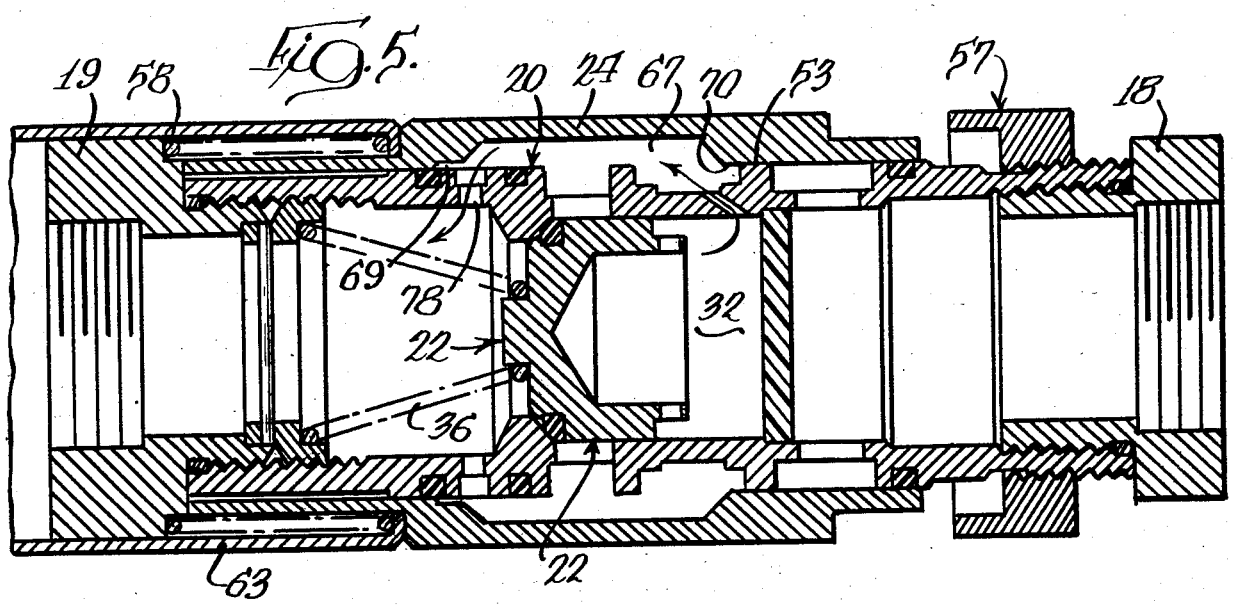

RUNAWAY PROTECTIVE FUSE VALVE

BACKGROUND OF THE INVENTION

Compressed air-driven general purpose reciprocating piston material pumps may be damaged as a result of an empty supply container, interrupted material supply to the pump, ruptured hoses and excessive cavitation. There have in the past been provided runaway valves that automatically shut off the supply of compressed air to the pump in response to an air flow rate in excess of a predetermined flow rate in an effort to protect the pump from damage as a result of these causes.

Such runaway valves are usually positioned in the supply air line between a pressure regulator and a piston reversing valve in the pump. All of the undesirable conditions noted above, i.e. empty supply container, interrupted material supply to the pump, ruptured hoses or excessive cavitation all result in a drop in pressure downstream from the runaway valve. Hence these runaway valves are designed to close when the pressure drop across the valve exceeds a predetermined maximum.

However, since it is desirable to change the flow rate through the valve to control pump speed, this complicates the runaway valve construction since flow rate is proportional to pressure drop and hence flow rate variation undesirably changes the responsiveness of the runaway valve.

In these prior runaway valves, after the valve closes in response to a predetermined downstream pressure drop, the valve remains in its closed position even though the condition causing the pressure drop has been corrected. Hence, a reset mechanism of some type is provided in the runaway valve to open the valve member after the downstream condition has been corrected. Usually this reset mechanism connects the inlet side of the valve to the outlet side across the poppet valve member and when downstream pressure approaches upstream pressure, a coil spring biasing the valve member moves it to its open position. This reset mechanism is slow-acting because the poppet valve member will not open until downstream pressure equals supply pressure, or approximately so, and hence the operator sometimes has to hold the reset mechanism for many seconds to be certain the valve member has been opened (remembering that he cannot visually see poppet valve member opening).

Still another disadvantage in prior runaway valve mechanisms is that they are subject to transient upstream pressure surges and temporary downstream pressure losses. If the runaway valve experiences a transient upstream pressure increase or a temporary downstream pressure loss, and produces a pressure drop across the valve member above the predetermined value, the poppet valve member will move to a closed position and shut the pump down unnecessarily, and of course the operator then is required to manually reset the runaway valve to again connect supply air to the material pump and reinstate its operation.

It is the primary object of the present invention to ameliorate the problems noted above in runaway valves for material pumps.

SUMMARY OF THE PRESENT INVENTION

In accordance with the present invention, an improved runaway protective valve is provided in the air supply line of a pnuematically driven material pump that shuts off the air supply when the air flow rate through the valve exceeds by a predetermined amount the pre-adjusted flow rate setting of the valve to prevent damage to the pump and conserve energy.

This runaway valve includes a poppet valve member, directly in the main air flow passage biased to its open position by a spring, that closes upon a predetermined pressure drop through the passage. As downstream pressure drops a predetermined value in relation to upstream pressure, the poppet valve member will close against the biasing force of the spring and remain in that position until reset. Pump speed is controlled by varying air flow rate through the runaway valve and this is effected by an axially movable sleeve surrounding the valve member having a pair of spaced lands, one of which controls the effective area of an orifice to vary flow rate. Hence flow rate is controlled by varying flow area and not pressure drop so that the runaway valve member, which responds only to pressure drop across the valve member, closes at a flow rate above the preselected value rather than at a fixed flow rate.

This first land on the sleeve, when the sleeve is shifted to its reset position, opens a bypass passage connecting the upstream side of the poppet to its downstream side, equalizing pressure across the valve and permitting the coil spring to move the valve from its closed position to its open position. Thus both flow control and poppet valve member reset is effected by the same sleeve in an uncomplicated, simple fashion.

The movement of the poppet valve member to its closed position upon sensing a predetermined pressure drop is delayed for a predetermined time to prevent the valve from closing in response to transient upstream pressure surges and temporary downstream pressure drops. Toward this end the upstream side of the piston faces a closed chamber open to supply pressure only through a small vent hole. This restrictor and chamber on the upstream side of the poppet valve member create a time delay to the application of full upstream pressure to the upstream side of the piston. This prevents premature valve closing such as when a pump piston is changing direction of stroke or there is a small momentary disturbance of supply air pressure.

Another aspect of the present invention is that supply air is not used to effect poppet valve member reset and hence valve reset occurs considerably more rapidly than in prior known runaway valves. Toward this end the second land on the sleeve when moved to its reset position isolates the valve member from supply pressure and the first land connects the downstream side of the poppet valve member through a bypass passage to the upstream poppet valve member chamber (then isolated from supply pressure) causing pressure to rapidly equalize across the valve and the valve to open without raising downstream pressure to the supply pressure value. This immediate opening of the runaway valve causes a temporary high pressure drop across the poppet valve member because of low downstream pressure, but the time delay vent hole and chamber prevent unwanted valve closing during this transient condition.

BRIEF DESCRIPTION OF THE DRAWINGS

FIG. 3 is a longitudinal section of the present runaway protective fuse valve similar to FIG. 2 showing the valve in its minimum flow rate position;

FIG. 4 is a longitudinal section of the present runaway protective fuse valve similar to FIG. 2 illustrating the valve in its closed position shutting off the supply of air to the pump; and FIG. 5 is a longitudinal section of the present runaway protective fuse valve similar to FIG. 4 with the valve in its closed position just prior to valve reset.

DETAILED DESCRIPTION OF THE PREFERRED EMBODIMENT

Figure 1:
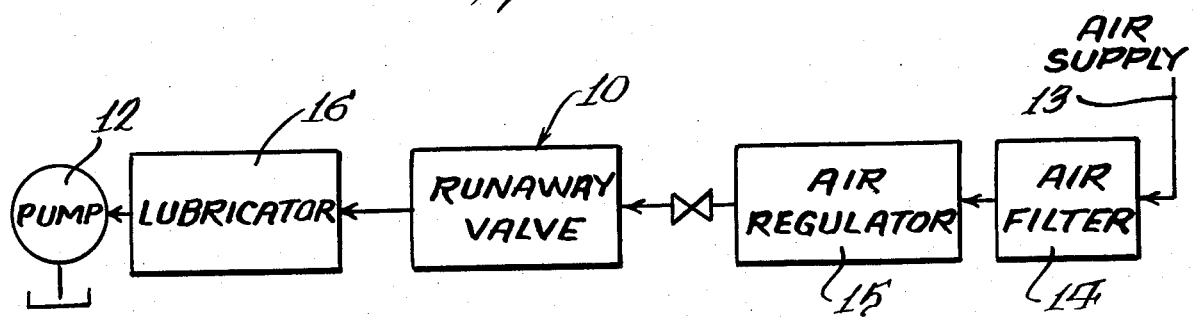
FIG. 1 is a block diagram showing the present runaway valve in the air supply line to a material pump.

Referring to the drawings and particularly to FIG. 1, a runaway valve 10 according to the present invention is illustrated in block diagram form in the air supply line for a material pump 12. The pump 12 is a general purpose reciprocating piston air-driven material pump usually mounted on the cover panel of a drum-type container that acts as a reservoir for the material to be pumped. In a typical system supply air 13 from a conventional air compressor system is delivered to the pump 12 through an air filter 14, an air pressure regulator 15, runaway valve 10, and a lubricator 16.

Figure 2:
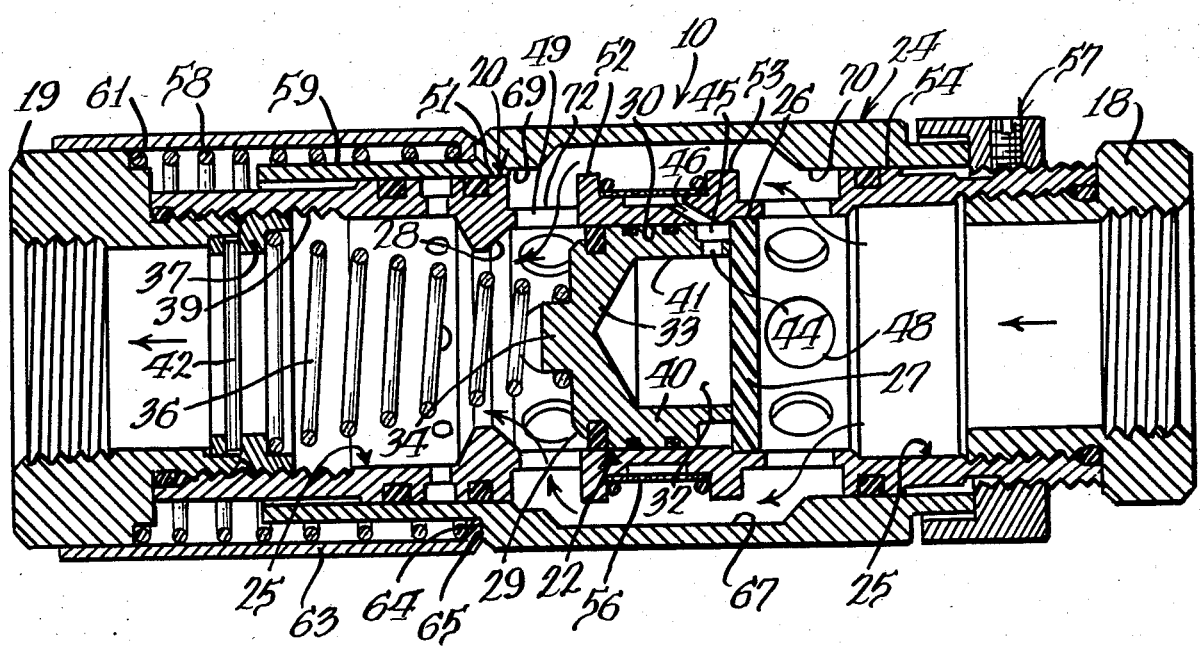
FIG. 2 is an enlarged longitudinal section of the runaway protective fuse valve in accordance with the present invention illustrated in its maximum flow rate position.

The runaway valve 10 as viewed in FIG. 2 has an inlet fitting 18 that receives air from air regulator 15 and an outlet fitting 19 connected to deliver air to the pump 12 through lubricator 16.

The runaway valve 10 generally includes a cylindrical body member 20 threadedly receiving inlet fitting 18 at one end and outlet fitting 19 at the other end, a shut-off poppet valve member 22 axially slidable in the body 20 to effect air flow shut-off, and a fine flow rate control and reset sleeve 24.

The body member 20 has a stepped internal bore 25 that is divided and sealed by a cylindrical sealing disc 26 mounted in the bore seated against a stepped portion 27 therein.

A frusto-conical valve seat 28 is formed in body bore 25 and forms a seat against which frusto-conical seating surface 29 on poppet valve member 22 engages when closed.

Poppet valve member 22 is generally annular in configuration and is slidable in valve body bore portion 30 and defines with seal disc 26 a substantially closed chamber 32 on the upstream side of the poppet valve member 22. Valve member 22 includes a forward transverse portion 33 having a central forwardly extending projection 34 that defines an internal seat for a tapered coil compression spring 36 that continuously urges valve member 22 to its open position illustrated in FIGS. 2 and 3. Spring 36 is seated at its other end in an annular spring seat 37 threaded into the outlet end of the valve body bore 25. The poppet valve member 22 has an annular skirt portion 40 with an enlarged bore 41 therein defining part of chamber 32. The rear or upstream side of the valve member communicates with supply pressure through radial bore 44 in skirt 41, annular recess 45 and diagonal restrictor vent hole 46 in body member 20.

The annular spring seat 37 is threadedly engaged with internal threads 39 in the left end of body member 20 as seen in FIG. 2 and is thereby axially adjustable in bore 25 to the right of its position shown against outlet fitting 19 to variably bias spring 36 and thus provide a coarse adjustment varying the flow rate at which valve 22 closes. A cross-pin 42 seated diametrally in spring seat 37 permits a needle-nose pliers to be inserted in outlet fitting 19 to rotate spring seat 37 and adjust it axially in bore 25. Seat 37 is shown in FIG. 2 in its low flow rate position, and its high flow rate position (its extreme right position) is limited by the end of threads 39.

A plurality of annularly arrayed radial bores 48 in the valve body 20 on the upstream side of seal 26 permit inlet flow to pass outwardly from bore 25 around the poppet valve member 22 and thence pass radially inwardly through another annular array of radial bores 49 immediately upstream of valve seat 22, into the downstream end of bore 25.

The valve body 20 has a plurality of spaced annular external lands 51, 52, 53 and 54 that slidably receive and align the flow control and reset sleeve 24 and with the sleeve 24 define flow rate control, poppet valve isolation and reset bypass valving functions.

An annular filter screen 56 is mounted between the lands 52 and 53 to keep the poppet valve member 22 and chamber 32 free from any foreign material in the supply air.

The sleeve 24 is annular in configuration and biased against a threaded adjusting nut 57 by a coil compression spring 58 that surrounds a reduced portion 59 on the left end of sleeve 24. Spring 58 reacts against a shoulder 61 on outlet fitting 19 and is held in alignment by a secondary surrounding sleeve 63 that has a radial flange 64 against which the movable end of spring 58 reacts. Flange 64 reacts against shoulder 65 on sleeve 24. Spaced internal sleeve lands 69 and 70 are formed in the sleeve. Land 69 is axially movable over valve body annular recess 72 to provide a variable flow area orifice in the main flow line of the valve.

The land 70 is positioned so that in the high flow rate position of the sleeve 24 illustrated in FIG. 2 it is sufficiently far from land 53 to provide unrestricted flow of supply air, and in the reset position of the sleeve illustrated in FIG. 5 it covers valve land 53.

In operation, the nut 57 is adjusted by rotation to axialy shift the sleeve 24 to provide the desired flow area at recess 72. This flow rate is controlled by varying the area of the orifice defined by the recess 72 and sleeve land 69. By moving the sleeve 24 to the position illustrated in FIG. 2 land 69 on the sleeve uncovers the recess 72 sufficiently to provide unrestricted flow and hence the maximum flow rate for the valve 10. Under normal operation air flows from inlet fitting 18 into valve body bore 25, out the valve body through radial bores 48 between the valve body 20 and the sleeve 24 in recess 67, into the radial passages 49 through open valve 22 and out fitting 19.

Flow rate is reduced by rotating nut 57 in a direction to shift sleeve 24 to the right partly or completely closing recess 72. Flow rate is reduced to its minimum value by adjusting the sleeve 24 to the FIG. 3 position where sleeve land 69 partly covers body land 52. There is a slight clearance between land 69 and land 52 in this position that meters the minimum flow through the valve.

If downstream pressure drops as a result of an empty material container, interrupted material supply to the pump, ruptured hose or excessive cavitation, the force of upstream pressure in chamber 32 acting on poppet valve 22 will shift the poppet valve to the left against valve seat 28 blocking the flow of air through the valve. Poppet valve 22 will remain in this closed position even though the downstream condition has been corrected because even though corrected, downstream pressure remains low and hence upstream pressure acting on the upstream side of valve member 22 will hold the valve closed. The valve is reset, i.e. the poppet valve is moved to its open position from its closed position illustrated in FIG. 4, by shifting the sleeve 24 to the position illustrated in FIG. 5. In this position the recess 67 in the sleeve 24 connects bypass ports 24 with chamber 32 behind poppet valve 22, permitting air to escape from the chamber to the downstream side of the poppet valve 22. This equalizes pressure on the opposite sides of the poppet valve and permits the spring 36 to shift the valve away from seat 28 back to its open position, illustrated in FIGS. 2 and 3.

It should be noted that in the reset position of the sleeve 24 illustrated in FIG. 5, sleeve land 70 covers body land 53 isolating the valve chamber 32 from supply pressure Since chamber 32 is relatively small, pressure rapidly falls in that chamber during reset permitting very rapid opening of the valve member 22. This is in contrast to prior runaway valves that reset the valve by raising downstream pressure on the valve as opposed to lowering upstream pressure, as in the present device.

Immediately after the valve member 22 is reset, and the sleeve 24 released so that it shifts back to its operating position, air flow will begin through radial passages 49 to the pump. For a short time, however, downstream pressure may continue to be low, but the time delay effect of chamber 32 and restrictor 46 prevent the poppet valve 22 from closing during this transient condition because they form a time-delay between inlet pressure variation and the pressure on the upstream side of the valve 22. Downstream pressure then increases to its normal value and prevents the poppet valve 22 from closing as pressure on the upstream side of the valve 22 approximately reaches supply pressure.

The time-delay function of the restrictor 46 and chamber 32 also prevent transient surges in upstream pressure and temporary drop of downstream pressure from unnecessarily closing valve member 22.

We claim:

1. A runaway shut-off valve for a pneumatic implement supplied compressed air through a conduit, comprising; a valve body having an inlet and an outlet interconnected by a main passage, a poppet valve member in the passage movable from an open position permitting flow through the passage to a closed position blocking flow through the passage, spring means biasing said poppet valve member toward its open position, said poppet valve member being responsive to a predetermined pressure drop between the inlet and the outlet to move to its closed position, means for delaying the closing movement of the poppet valve member after said predetermined pressure drop is reached so that transient pressure variations do not cause unwanted poppet valve member closing, a variable orifice in the passage upstream of the poppet valve member, an axially slideable sleeve surrounding the body and controlling the effective area of the orifice, and means for interconnecting the upstream and downstream sides of the poppet valve member to reset the poppet valve member to its open position including passage means in the sleeve responsive to predetermined axial movement of the sleeve.

2. A runaway shut-off valve for a pneumatic implement supplied compressed air through a conduit, comprising; a valve body having an inlet and an outlet interconnected by a main passage, a poppet valve member in the passage movable from an open position permitting flow through the passage to a closed position blocking flow through the passage, spring means biasing said poppet valve member toward its open position, said poppet valve member being responsive to a predetermined pressure drop between the inlet and the outlet to move to its closed position, and means for resetting the poppet valve member from its closed position to its open position including means for isolating the upstream side of the poppet valve member from inlet pressure and connecting the upstream side thereof to the downstream side thereof to equalize pressure across the poppet valve member and permit the spring means to move the valve member to its open position.

3. A runaway shut-off valve for a pneumatic implement as defined in claim 2, including a sleeve axially slidable around the poppet valve member and having a recess defining a portion of the passage when moved axially to a predetermined position, said sleeve being moveable to another position isolating the poppet valve member from the inlet, a bypass passage in the valve body communicating with the downstream side of the poppet valve member, said sleeve recess being positioned in the other position of the poppet valve member to connect the upstream side of the poppet valve member with the bypass passage to effect poppet valve member reset.

4. A runaway shut-off valve for a pneumatic implement as defined in claim 3, including a closed guide chamber slidably receiving the poppet valve member to isolate the upstream side of the poppet valve member, and a vent hole communicating the chamber with the sleeve recess to delay the response of the poppet valve member to transient pressure variations.

5. A runaway shut-off valve for a pneumatic implement as defined in claim 3, including an orifice in the main passage on the upstream side of the poppet valve member, said sleeve having a land adapted to control the effective area of the orifice, and means for axially adjusting the sleeve to control the flow rate through the valve.

6. A runaway shut-off valve for a pneumatic implement supplied compressed air through a conduit, comprising; a valve body having an inlet and an outlet interconnected by a main passage, a poppet valve member in the passage movable from an open position permitting flow through the passage to a closed position blocking flow through the passage, spring means biasing said poppet valve member toward its open position, said poppet valve member being responsive to a predetermined pressure drop between the inlet and the outlet to move to its closed position, an orifice in the main passage upstream of the poppet valve member, a bypass passage for connecting the upstream side of the poppet valve member with the downstream side thereof, an axially movable sleeve surrounding the poppet valve member having first land means normally closing the bypass passage and second land means for varying the effective area of the orifice, and means for axially adjusting the sleeve in a first position thereof to vary orifice area and control flow rate through the valve, said sleeve being movable to a second position opening said bypass passage to effect reset of the poppet valve member from its closed position.

7. A runaway shut-off valve for a pneumatic implement as defined in claim 6, including spring means for biasing the sleeve to its first position, and an axially adjustable stop for the sleeve to control the position of the sleeve in its first position.

8. A runaway shut-off valve for a pneumatic implement as defined in claim 6, including a closed guide chamber slidably receiving the poppet valve member to isolate the upstream side of the poppet valve member, and a vent hole connecting the chamber with the passage to delay the response of the poppet valve member to transient pressure variations, said sleeve having third land means isolating the vent hole from inlet pressure in the reset second position thereof so that reset is effected by connecting the guide chamber with the downstream side of the poppet valve member through the bypass passage.

9. A runaway shut-off valve for a pneumatic implement as defined in claim 6, including means for adjusting the biasing force on the spring means to provide a coarse adjustment for the flow rate through the valve member.

10. A runaway shut-off valve for a pneumatic implement supplied compressed air through a conduit, comprising; a valve body having an inlet and an outlet interconnected by a main passage, a poppet valve member in the passage movable from an open position permitting flow through the passage to a closed position blocking flow through the passage, spring means biasing said poppet valve member toward an open position, said poppet valve member being responsive to a predetermined pressure drop between the inlet and the outlet to move to its closed position, and means for delaying the closing movement of the poppet valve member after said predetermined pressure drop is reached so that inlet pressure transient pressure variation do not cause unwanted poppet valve member closing, means for resetting the poppet valve member from its closed position to its open position including means for isolating the upstream side of the poppet valve member from inlet pressure and connecting the upstream side of the poppet valve member to the downstream side thereof to equalize pressure across the poppet valve member and permit the spring means to move the valve member to its open position, an orifice in the main passage upstream of the poppet valve member, a bypass passage for connecting the upstream side of the poppet valve member with the downstream side thereof, an axially movable sleeve surrounding the valve member having first land means normally closing the bypass passage and second land means for varying the effective area of the orifice, and means for axially adjusting the sleeve in a first position thereof to vary orifice area and control flow rate through the valve, said sleeve being movable to a second position opening said bypass passage to effect reset of the poppet valve member.

11. A runaway shut-off valve for a pneumatic implement supplied compressed air through a conduit, comprising: a valve body having an inlet and an outlet interconnected by a main passage, a poppet valve member in the passage movable from an open position permitting flow through the passage to a closed position blocking flow through the passage, spring means biasing said poppet valve member toward its open position, said poppet valve member being responsive to a predetermined pressure drop between the inlet and the outlet to move to its closed position, an orifice in the main passage upstream of the poppet valve member, a bypass passage for connecting the upstream side of the poppet valve member with the downstream side thereof, an axially movable sleeve surrounding the poppet valve member having first means normally closing the bypass passage and second means for varying the effective area of the orifice, and means for axially adjusting the sleeve in a first position thereof to vary orifice area and control flow rate through the valve, said sleeve being movable to a second position opening said bypass passage to effect reset of the poppet valve member from its closed position.

* * * * *